United States Patent
Webber et al.

(10) Patent No.: US 11,481,385 B1
(45) Date of Patent: Oct. 25, 2022

(54) GRAPH DATABASE SYSTEM TO SAFELY STORE DATA AT HIGH VOLUME AND SCALE

(71) Applicant: Neo4j Sweden AB, San Mateo, CA (US)

(72) Inventors: James Webber, Guildford (GB); Hugo Firth, London (GB)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 17/162,975

(22) Filed: Jan. 29, 2021

(51) Int. Cl.
*G06F 16/00* (2019.01)
*G06F 16/23* (2019.01)
*G06F 16/21* (2019.01)
*G06F 16/27* (2019.01)
*G06F 16/28* (2019.01)

(52) U.S. Cl.
CPC ........ *G06F 16/2393* (2019.01); *G06F 16/212* (2019.01); *G06F 16/27* (2019.01); *G06F 16/287* (2019.01)

(58) Field of Classification Search
CPC combination set(s) only.
See application file for complete search history.

(56) References Cited

U.S. PATENT DOCUMENTS

| | | | |
|---|---|---|---|
| 6,216,126 B1* | 4/2001 | Ronstrom | G06F 9/466 |
| 2011/0208912 A1* | 8/2011 | Chambliss | G06F 11/1076 |
| | | | 711/114 |
| 2012/0166407 A1* | 6/2012 | Lee | G06F 9/466 |
| | | | 707/703 |
| 2012/0167098 A1* | 6/2012 | Lee | G06F 16/2379 |
| | | | 718/101 |
| 2012/0303576 A1* | 11/2012 | Calder | G06F 16/275 |
| | | | 707/611 |

* cited by examiner

*Primary Examiner* — Khanh B Pham
(74) *Attorney, Agent, or Firm* — Van Pelt, Yi & James LLP

(57) ABSTRACT

Techniques are disclosed to safely and performantly store data in a distributed graph database. In various embodiments, a combination of a replication protocol for data redundancy with a chain-commit protocol is used to ensure a safe ordering of concurrent updates across servers. The resulting protocol allows a distributed graph database to simultaneously uphold ACID properties and a useful degree of scalability through concurrent processing of updates in the typical case, and serialization of updates only where data integrity would otherwise be at risk.

19 Claims, 10 Drawing Sheets

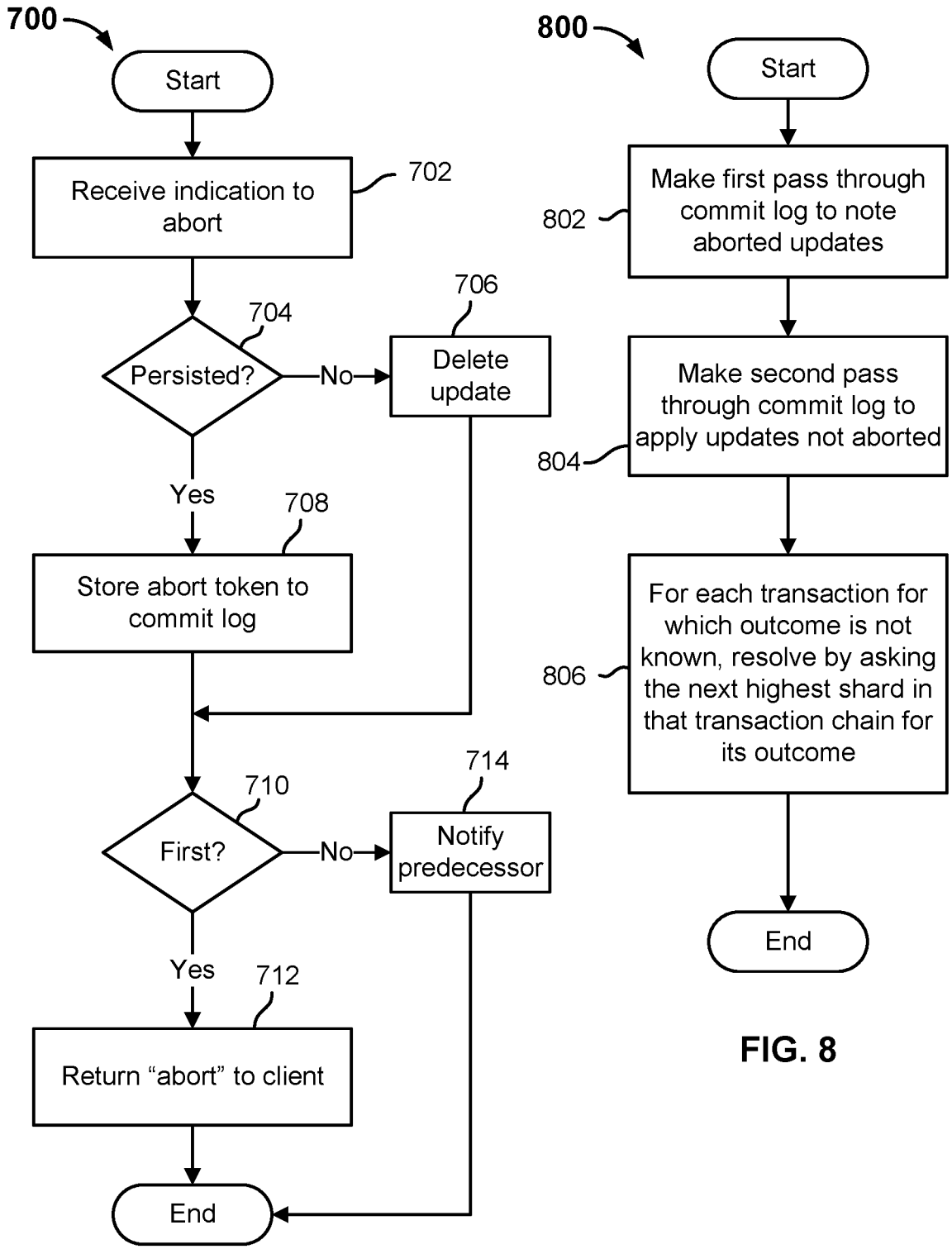

GRAPH DATABASE SYSTEM TO SAFELY STORE DATA AT HIGH VOLUME AND SCALE

BACKGROUND OF THE INVENTION

A graph database is a computerized record management system that uses a network structure with nodes, edges, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and a social network system, to name a few.

The graph model is popular; however, the field of high-performance graph database management systems is in its infancy. One common approach to improve the performance of graph databases is to partition the graph across multiple cooperating computer servers with the aim to increase processing throughput of the system as a whole.

Current graph database methods for storing graphs across a network of computer servers typically depend on eventually-consistent protocols to support updates to the graph data. Such protocols are widespread in database management systems and are performant as they allow concurrent processing of database requests. However, eventual consistency is unable to maintain data integrity in a distributed graph database.

It is known from research that relationships that span computer servers are susceptible to corruption when written through eventually consistent protocols. Moreover, it is known that the rate of corruption, while generally very low, compounds over time as corrupt data is used as the basis for future updates, spreading through the structure of the graph.

It is possible to use stronger commit protocols which uphold the traditional ACID properties. The drawback with such schemes is the requirement for coordination which results in contention and limited scalability and thus low performance. Typically, a single coordinator will impose a total ordering for all transactions in a system. While this virtually ensures correctness, it also virtually ensures low scalability.

BRIEF DESCRIPTION OF THE DRAWINGS

Various embodiments of the invention are disclosed in the following detailed description and the accompanying drawings.

FIG. 7 is a flow diagram illustrating an embodiment of a process to abort a transaction to update data in a distributed graph database system according to a chained commit protocol.

FIG. 8 is a flow diagram illustrating an embodiment of a process to recover from a failure in a distributed graph database system configured to implement a chained commit protocol.

DETAILED DESCRIPTION

Figure 1:
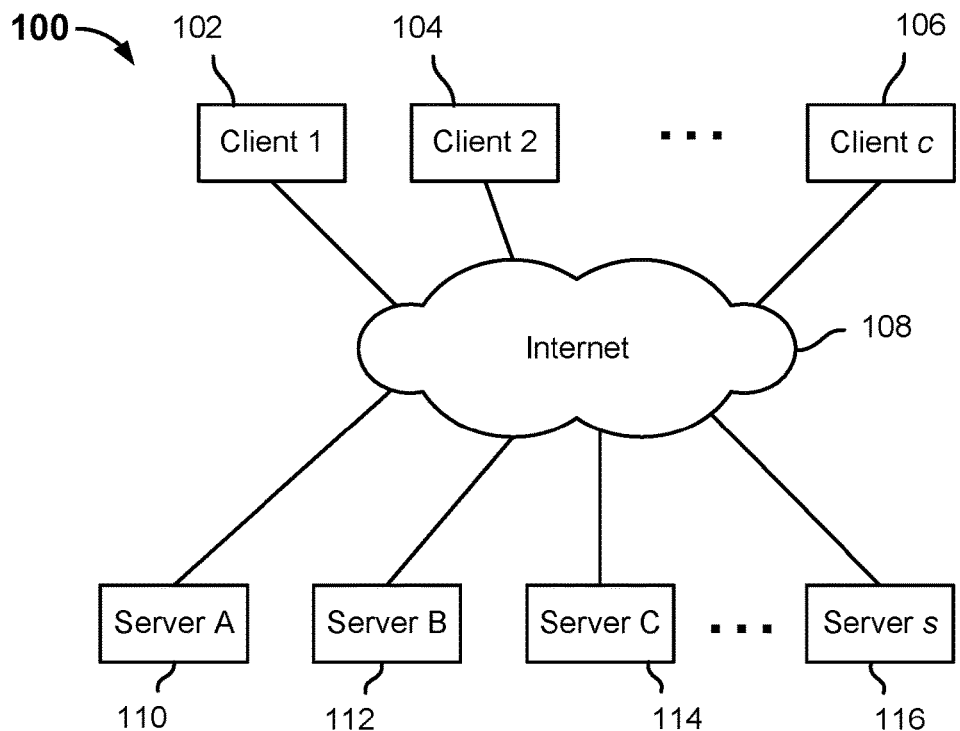
FIG. 1 is a block diagram illustrating an embodiment of a distributed database management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to safely and performantly update distributed data systems, such as a distributed graph database, that require adherence to ACID or similar properties. In various embodiments, a chained commit protocol as disclosed herein is implemented and used to execute transactions that require updates to data distributed across multiple "shards" of a distributed data set, such as a distributed graph database.

In various embodiments, techniques disclosed herein enable data comprising a labelled property graph structure to be persisted safely and performantly across a number of collaborating computer servers. A safe partial ordering of updates is imposed with respect to updates to a single (potentially large) graph structure partitioned across multiple cooperating computer servers.

In various embodiments, a system as disclosed herein method upholds ACID semantics while permitting concurrent updates at multiple servers with low coordination overhead. This allows distributed graph databases to store data safely while exhibiting a useful degree of concurrent processing for scalability to manage large data sets and challenging workloads.

FIG. 1 is a block diagram illustrating an embodiment of a distributed database management system. In the example shown, distributed database management system and environment 100 includes a plurality of client systems and/or devices, represented in FIG. 1 by clients 102, 104, and 106, connected via the Internet 108 to a distributed database management system comprising a plurality of database servers 1 through s, represented in FIG. 1 by servers 110, 112, 114, and 116. In various embodiments, clients such as clients 102, 104, and 106 are configured, e.g., via client application software, to update data stored in a distributed manner on servers comprising the distributed database management server, such as servers 110, 112, 114, and 116, including via a chain commit protocol as disclosed herein.

Database management systems, such as the system shown in FIG. 1, are a common part of the modern IT landscape. They are responsible for storage and querying of data on behalf of a range of IT systems. In the case of a graph database, the user (which may be a human, or another computer system or application) stores data as a network of connected nodes (vertices) and relationships (edges). Relationships have a type, direction, and optional key-value property data. Nodes have any number of labels to indicate their role, and any number of key-value properties. This is known as the labelled property graph model.

Figure 2:
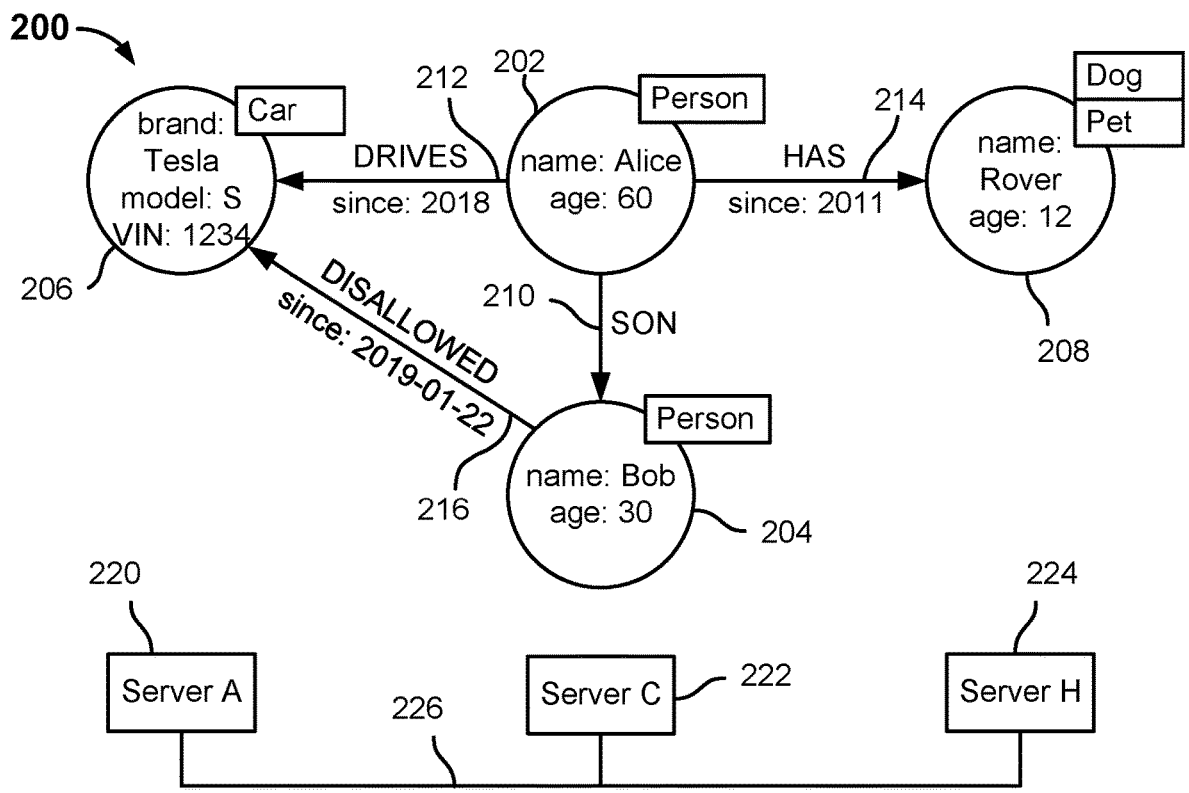
FIG. 2 is a diagram illustrating an example of a labelled property graph such as may be stored in an embodiment of a distributed graph database system.

FIG. 2 is a diagram illustrating an example of a labelled property graph such as may be stored in an embodiment of a distributed graph database system. In the example shown, a small graph 200 is presented which shows Alice (represented by a node 202 labeled "Person") who has a son called Bob (relationship 210, labeled "SON", to node 204, labeled "Person"). Alice has since 2011 had a pet dog named Rover, now 12 years old (relationship 214 labeled "HAS" with attribute "since" having value "2011" to node 208 labeled "Dog" and "Pet" with attribute "age" having value "12") and she has driven a particular car since 2018 (relationship 212 labeled "DRIVES" with attribute "since" having value "2018" to node 206 labeled "Car" having attributes indicating the "brand", "model", and "VIN" as shown). Notably Bob, for some reason, is disallowed (relationship 216 labeled "DISALLOWED" and having "since" attribute with a value of the date indicated) from driving his mother Alice's car. While this graph 200 is small, it is packed with information. In practice we find that graphs may contain many billions of nodes, relationships, attribute values, and labels and even at that scale be equally packed with information.

In the labelled property graph model, it is normal for queries to traverse relationships in either direction from head to tail or vice versa. In the example in FIG. 2, we might ask "what pets, if any, does Alice own?" or equally we might ask "who owns this pet dog?" This seemingly innocuous requirement poses several difficult dependability challenges for graph database management systems.

When the database management system is distributed over multiple collaborating computer servers, the graph which it hosts are partitioned between those servers. In the example graph 200 shown in FIG. 2, for example, the data of graph 200 may be partitioned across servers 220, 222, and 224, connected by network 226 in the example shown. For example, data for node 206 may be stored on server 220, data for nodes 202 and 204 on server 222, and data for node 208 on server 224, with data for relationships being stored on a server/shard associated with the node from which the relationship originates.

In various embodiments, a database administrator first decides upon the partitions or "shards" which will be present in the database. The choice of the number shards and how the data is placed in them may be a modelling task for the database administrator (who understands the data model and access patterns) or it may be algorithmic. For example, a photo-sharing system might shard its customer's pictures by the users domicile on the basis that relatively few customers share their personal photo albums across continents. Equally an algorithm might choose to partition the graph across shards in a manner that minimizes the number of cross-shard relationships.

Other examples of criteria that may be used to partition data include, without limitation geography (e.g., choosing a server located in a same geographical region as an attribute of the data being stored, such as the owner or subject of the data) and allocating based on a hash of one or more attributes of the data, such as all or part of a value comprising the data. Data may be so partitioned to allow the graph to be queried and updated concurrently on multiple servers to improve performance of the database.

In the example shown in FIG. 2, the data of graph 200 is partitioned across servers 220, 222, and 224, which may be a subset of servers and/or partitions (sometimes referred to herein as "shards") comprising a distributed database system. For example, servers 220, 222, and 224 of FIG. 2 may be a subset of the servers 1 through s of FIG. 1. Other data, for graphs other than graph 200 of FIG. 2, may be partitioned among a different (potentially overlapping) subset of servers. Transactions implicating different (potentially overlapping or perhaps not overlapping) subsets of servers may be processed concurrently, in various embodiments, as described more fully below.

There are caveats to a distributed design. Safely storing and updating a graph which is partitioned between multiple servers is difficult. We can use traditional approaches like two-phase commit which are known to be safe, but also low performance. For high performance, we could choose eventually consistent protocols to manage updates, but these are unsafe for graphs since they allow a risk for inconsistent updates.

Worse, unlike other data models that deal with discrete data elements, for graph database management systems even small inconsistencies multiply and spread as semantic errors around the data, following the paths in the graph. When a graph database management system is executed on multiple collaborating computer servers, achieving both performance and safety for storing graph data is non-trivial.

Another requirement for any practical system is that it must possess sufficient redundancy so that if there are failures data is not lost and processing can continue. A dependable distributed graph database management system needs such redundancy for high availability. The inventive concept thus composes safe, performant updates of a distributed graph with redundancy for high availability.

In various embodiments, a distributed database system as disclosed herein may include a plurality of redundant replica sets. A redundant replica set may include multiple servers, saving multiple copies of a single computer server, such that if one server is lost, others can continue serving workload with no loss of data. The number of servers required in a redundant replica set is a function of the level of fault tolerance required by the database administrator. It is typically no fewer than three servers for online fault tolerance. In a distributed database system in which such redundancy is provided, each partition may be stored on a server that is itself a redundant replica set, with each server in the set storing a copy of the data in that partition.

There are numerous protocols for creating and managing redundant replica sets. In various embodiments, a replication protocol such as the Raft consensus protocol is used to replicate data within each redundant data set. In other embodiments, a replication algorithm other than the Raft algorithm may be used.

In various embodiments, a distributed database system as disclosed herein treats a set of redundant replicas managed by the Raft protocol as a single database partition or "shard". In various embodiments, concurrent updates of a graph partitioned over such shards are performed in a safe manner: one whose ordering is consistent in the presence of contended concurrent workloads.

In various embodiments, a set of rules are implemented which safely coordinate updates to the servers hosting a partitioned graph in a manner that imposes an update ordering only when strictly needed. In the more general case, the rules allow uncoordinated, concurrent update of servers when it is safe to do so.

In various embodiments, a second protocol sometimes referred to herein as a "chained commit protocol" is used to coordinate updates across cooperating shards. With a chained commit protocol, there is no central server to coordinate updates across shards which potentially removes a bottleneck and improves throughput. Instead of a centralized coordinator, each server hands-off the update to the next server in the "chain" for a given transaction: on the outbound chain the servers prepare the work which may include ensuring the data is held on redundant stable storage and checking the data values for any constraint violations. On the return chain the servers commit the work making it visible to users of the graph database management system.

In various embodiments, a new chain commit protocol variant disclosed herein is used with an existing replication protocol, such as Raft. The protocols are used together, as disclosed herein, to achieve the dual goals of safety and high performance.

Figure 3A:
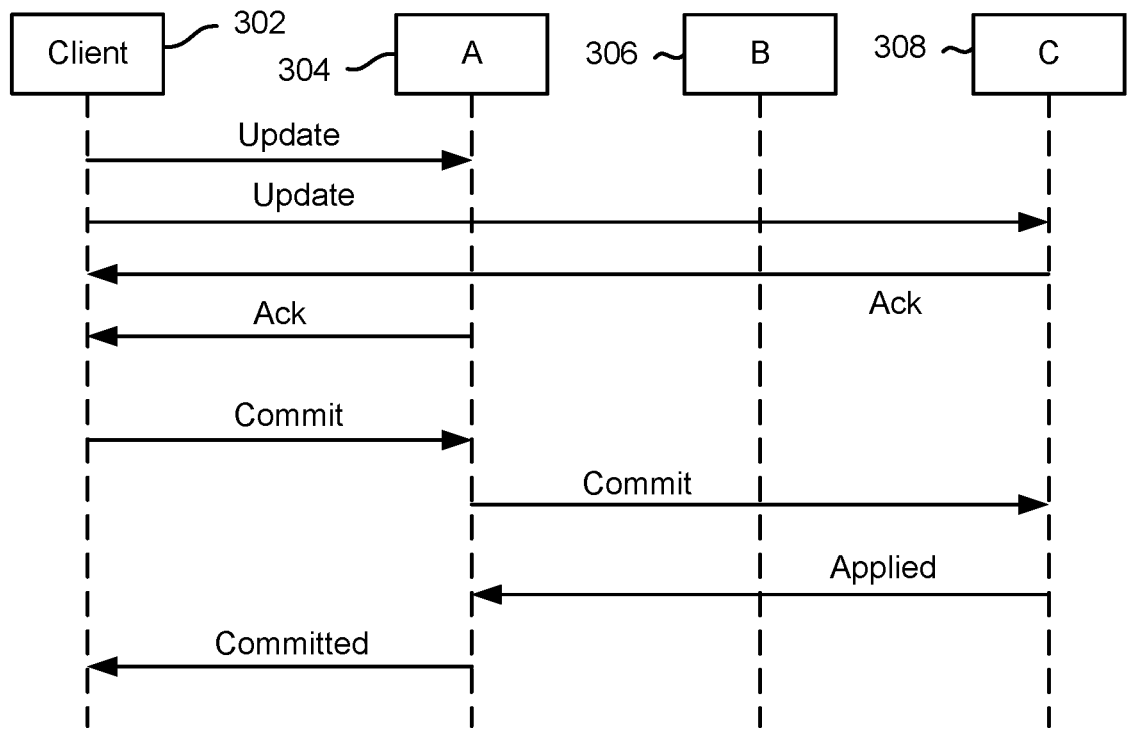
FIG. 3A is a call sequence diagram illustrating an embodiment of a system and process to safely store data at high volume and scale, according to a chained commit protocol.

FIG. 3A is a call sequence diagram illustrating an embodiment of a system and process to safely store data at high volume and scale, according to a chained commit protocol. Cross-shard updates proceed as follows. The system decides which shards are involved in the update. This can be performed algorithmically or by explicit declaration by the user. The client-side machinery 302 creates a unique transaction identifier and delivers the intended updates from the user or client application to each targeted shard only, e.g., to servers 304 and 308 in the example shown, in which server 306 does not store data implicated by the transaction. The updates are stored at each targeted shard 304, 308 awaiting invocation of the transaction commit protocol. The updates delivered to each shard may be stored in transient memory for low cost, (but higher spurious aborts). Updates may also be stored in durable memory at higher cost (but fewer spurious aborts).

Should the client 302 fail and not recover at this stage, its updates will be garbage collected at some future point. The chained commit protocol disclosed herein makes this a safe operation even in the event of a race condition. If a client recovers and tries to commit a transaction some of whose updates have been garbage collected, the transaction will safely abort. The client can then decide whether to execute the update again.

In the typical non-failure case, the transaction commit protocol is then executed by the client application deciding to make its updates permanent. The commit protocol begins at the shard with the lowest lexical ID, e.g., the arrow "Commit" from client 302 to server 304 in the example shown in FIG. 3A. One server in that shard (e.g., the current Raft leader) checks for the absence of constraint violations, and then persists the update across commit log which is replicated across multiple servers.

Durability means safe and ready for application to the database (e.g., committed in its Raft log). Crucially it does not mean those updates have been applied to the database model: the update is not yet visible to database users. At this point, the shard is in a safe state (e.g., present on a majority of servers) where it can, at some future point, update the database model or (because of subsequent constraint or machinery failures) choose to not apply those updates.

The shard (e.g., server 304) then contacts the shard with the next lowest lexical ID that is enrolled in the transaction, in this example server 308, creating the first link of the chain in the protocol. At the next shard, if any, the same activity occurs: the update is made durable across the replicas which constitute that shard but is not immediately applied to the database model. The chain continues until all shards have made their updates durable, terminating at the shard with the highest lexical ID, e.g., server 308 in the example shown in FIG. 3A.

On the outward chain, if a shard safely stores the update, then the shard is committed to apply that update in future even if it subsequently suffers failures. Progress for any transaction that crosses a failed shard will be stalled waiting recovery: this is necessary for safety.

Once the final shard in the current chain (server 308 in the example shown in FIG. 3A) has performed constraint validation and completed making its updates durable, it can apply those changes to its database model making the changes visible to clients. It then contacts the previous shard in the transaction chain to inform it of a successful application (e.g., arrow labeled "Applied" from server 308 to server 304 in FIG. 3A). In turn that shard applies its updates to its local model and informs its predecessor shard, and so on back to the initiating shard.

Each shard in reverse sequence executes the same behavior until the transaction return chain reaches the initiating shard, e.g., server 304 of FIG. 3A. At which point, the transaction has been applied to all shards safely and the updates are visible to clients. The client that initiated the transaction is informed of its success, e.g., arrow "Committed" from initiating shard/server 304 to client 302.

Figure 3B:
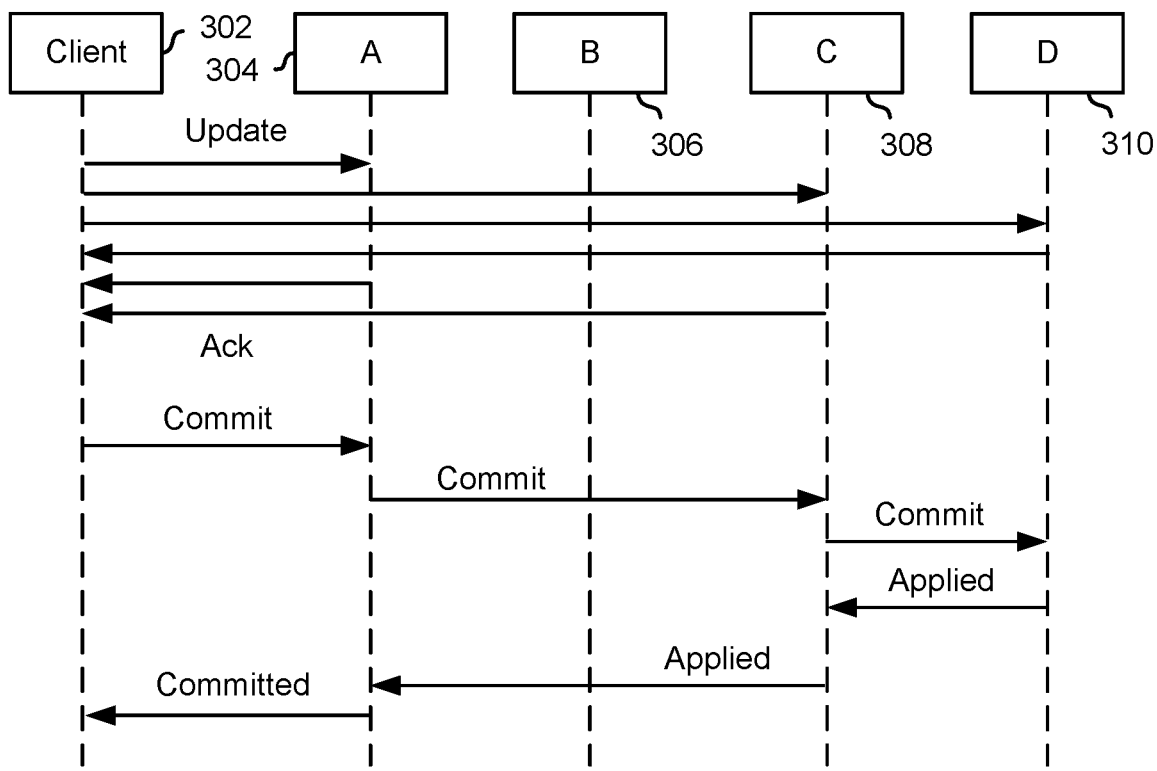
FIG. 3B is a call sequence diagram illustrating an embodiment of a system and process to safely store data at high volume and scale.

FIG. 3B is a call sequence diagram illustrating an embodiment of a system and process to safely store data at high volume and scale. In the example shown in FIG. 3B, the distributed database system comprises four partitions or shards, represented in FIG. 3B by servers 304, 306, 308, and 310. In the example shown, client 302 initiates a transaction that involves data partitioned across servers 304, 308, and 310. The client 302 determines that those three servers 304, 308, and 310 are involved in the transaction and sends the update to each. The client 302 then initiates the chained commit protocol as disclosed herein by sending a "commit" command to the first server (shard) in lexical order, represented by arrow "Commit" from client 302 to server 304 in FIG. 3B. The chained commit protocol then proceeds as described in connection with FIG. 3A, with each of the servers 304, 308, and 310 receiving sequentially, in lexical order starting with a first in lexical order, a message to "Commit" the transaction, each committing the transaction locally by writing associated data in its local "commit" log and then passing the "commit" operation up the chain to the participating server that is next in lexical order until the last server in the chain, server 310 in the example shown in FIG. 3B, is reached. The last server in the chain, upon determining it is last, then applies the update to its database model and informs its predecessor in the chain that it has done so, prompting the predecessor to do the same, and so on, until the first server/shard in the chain is reached, e.g., server 304 in the example shown in FIG. 3B. Upon applying the update to its database model, the first server 304 informs the client 302 that the transaction has been committed.

While in FIG. 3A the distributed database system is shown to include three shards (A, B, and C, in lexical order, i.e., alphanumeric order by name or other unique identifier) and in FIG. 3B the distributed database system is shown to include four shards, in various embodiments a distributed database system as disclosed herein may include more or fewer shards. While in the examples shown in FIGS. 3A and 3B the first server implicated by the transaction was the server 304 which was first in lexical order among all servers in the distributed database system, for other transactions a server other than server 304 may be first in lexical order. For example, a transaction may involve only servers 306 and 308, in which case the server 306 (labeled "B") may be determined to be first in lexical order among those needed to participate in the transaction, in which case the client 302 would initiate the chain commit protocol as disclosed herein by a sending a "commit" message to server 306.

While in various embodiments the chained commit protocol as disclosed herein is performed in "lexical" order, in various embodiments any deterministic and repeatable ordering algorithm or technique may be used.

Figure 3C:
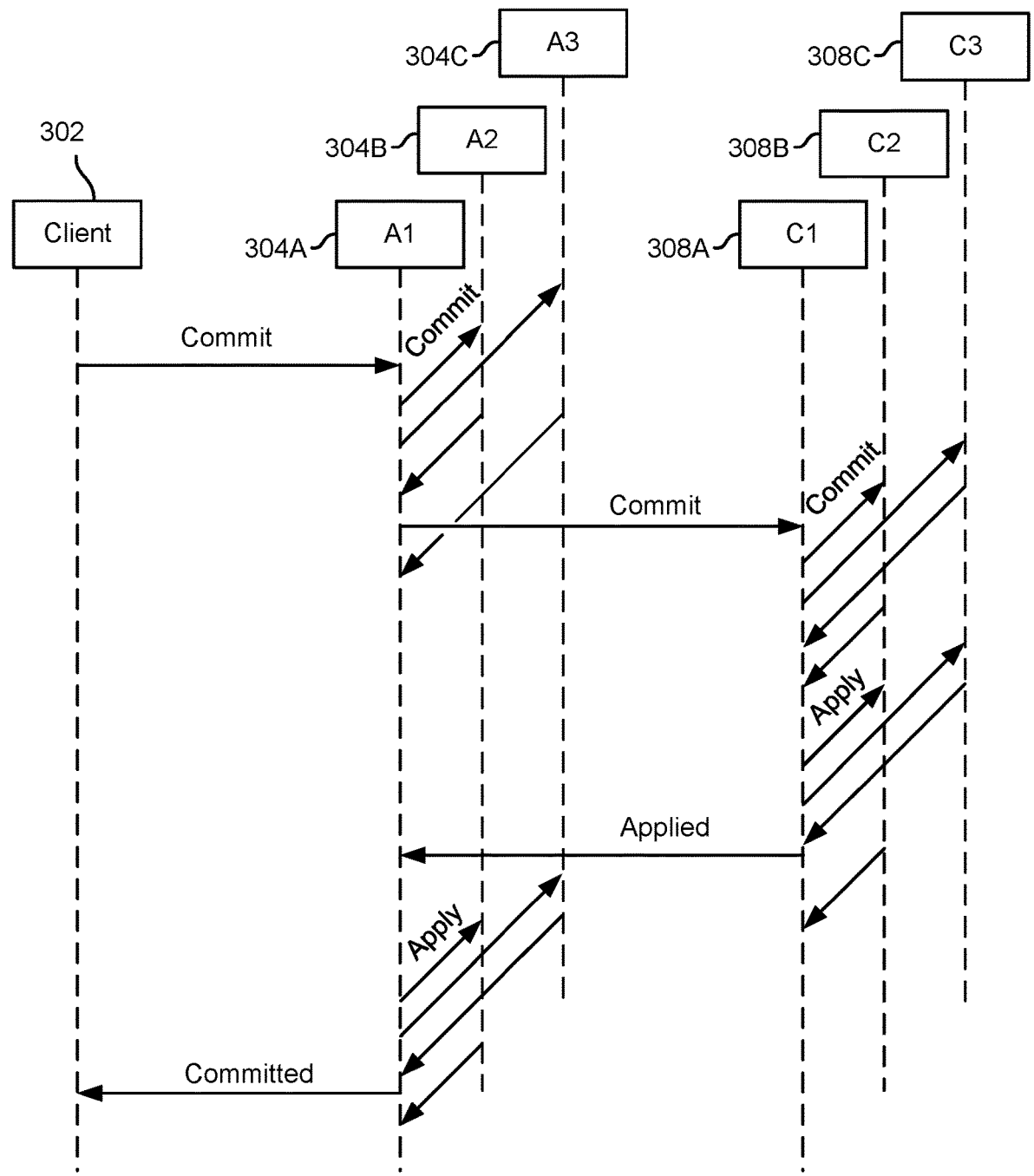
FIG. 3C is a call sequence diagram illustrating an embodiment of a system and process to safely store data at high volume and scale.

FIG. 3C is a call sequence diagram illustrating an embodiment of a system and process to safely store data at high volume and scale. In the example shown, the chained commit protocol aspects of the example shown in FIG. 3A are illustrated with the addition of elements illustrating aspects of interplay between the chained commit protocol, as disclosed herein, and the Raft consensus protocol. In the example shown, server 304 of FIG. 3A is shown to be implemented as a redundant replica set of servers 304A, 304B, and 304C, configured to replicate data according to the Raft consensus protocol. Likewise, server 308 of FIG. 3A is shown to be implemented as a redundant replica set of servers 308A, 308B, and 308C.

As illustrated in FIG. 3C, at each stage of the chained commit protocol as shown in FIG. 3A, the redundant replica set of servers (304A, 304B, and 304C, for server 304 or "A"; and 308A, 308B, and 308C, for server 308 or "C") implement the Raft consensus protocol. The shard does not pass processing on to the next shard in the participating chain until its local processing is determined to have been completed successfully according to the Raft protocol. For instance, in the example shown, the shard associated with server 304 of FIG. 3A is shown in FIG. 3C to pass the "commit" instruction up the chain to the shard associated with server 304 of FIG. 3A once a majority of servers in its redundant replica set, in this example servers 304A and 304B, have committed the transaction, e.g., once server 304A has written the transaction to its commit log and successful replication of that entry has been confirmed by server 304B. In this example, the "commit" operation is passed up the chain before the third server 304C has confirmed successful replication, because the Raft protocol only requires a majority of servers to have confirmed an action/replication. Similarly, the last shared in the chain shown, corresponding to server 308 of FIG. 3A, responds with the message "applied", sent to its predecessor in the chain, i.e., server 304 of FIG. 3A in this example, before the server 308B has confirmed replication of the update to the local database model.

The further detail shown in FIG. 3C illustrates the interplay between the chained commit protocol disclosed herein and the Raft (or other) replication protocol. As shown by this example, processing may be advanced up (to commit) or back (to apply) the chain as soon as the (minimum) requirements of the Raft (or other) replication protocol have been met.

Figure 3D:
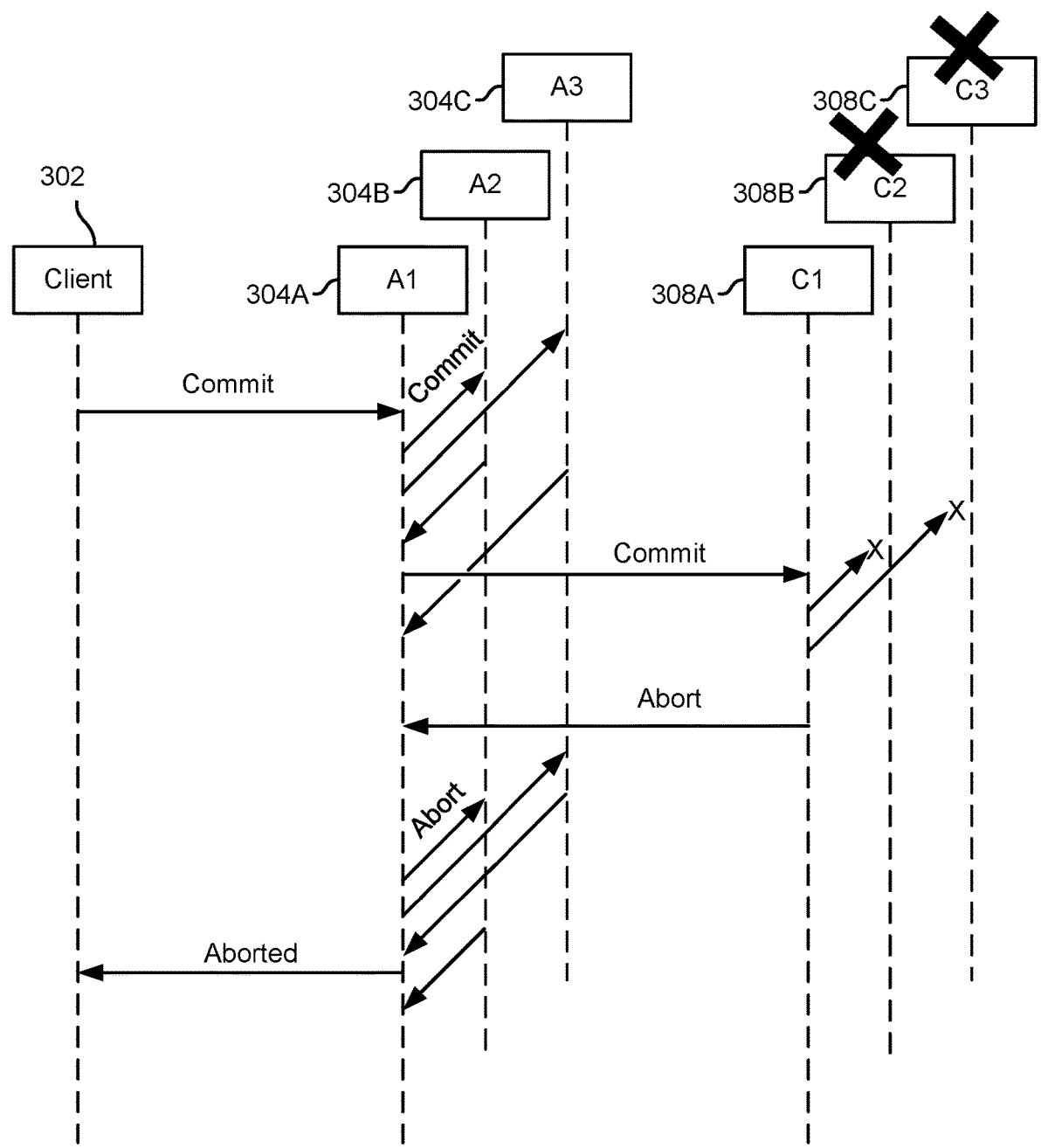
FIG. 3D is a call sequence diagram illustrating an embodiment of a system and process to safely store data at high volume and scale.

FIG. 3D is a call sequence diagram illustrating an embodiment of a system and process to safely store data at high volume and scale. In various embodiments, should any shard be unable to process an update because failures or constraint violations, it can terminate the chain and inform its predecessor shard of its decision.

In the example shown in FIG. 3D, shard A, comprising servers A1, A2, A3 (304A, 304B, 304C) commits its update successfully to its shared log. A1 and A2 are the first to commit and since they together form a majority, the commit is safely in the shared log of shard A. Subsequently A1 sends the commit message onward to the next shard in the chain. Within shard A, server A3 eventually responds that it has committed the update to its shared log—that it was slow has not impeded progress since the fastest majority is sufficient.

When the commit message arrives at Shard C, it is received by server C1. But the commit fails C since only server C1 is available while C2 and C3 are not. C1 sends commit messages to C2 and C3 but receives no responses since they are down. Eventually C1 times out, concluding that it cannot take any forward action safely. C1 duly responds to shard A that it has aborted the transaction, the only safe option.

When the abort message is received at server A1, the servers in shard A make durable an abort token for that transaction. It does not apply the update to its database model and can discard the update. It passes the aborted message back to the client.

In longer chains, the same behavior is executed on all predecessor shards all the way back to the origin of the transaction whereupon the client is signaled that the transaction has failed along with a reason.

Figure 3E:
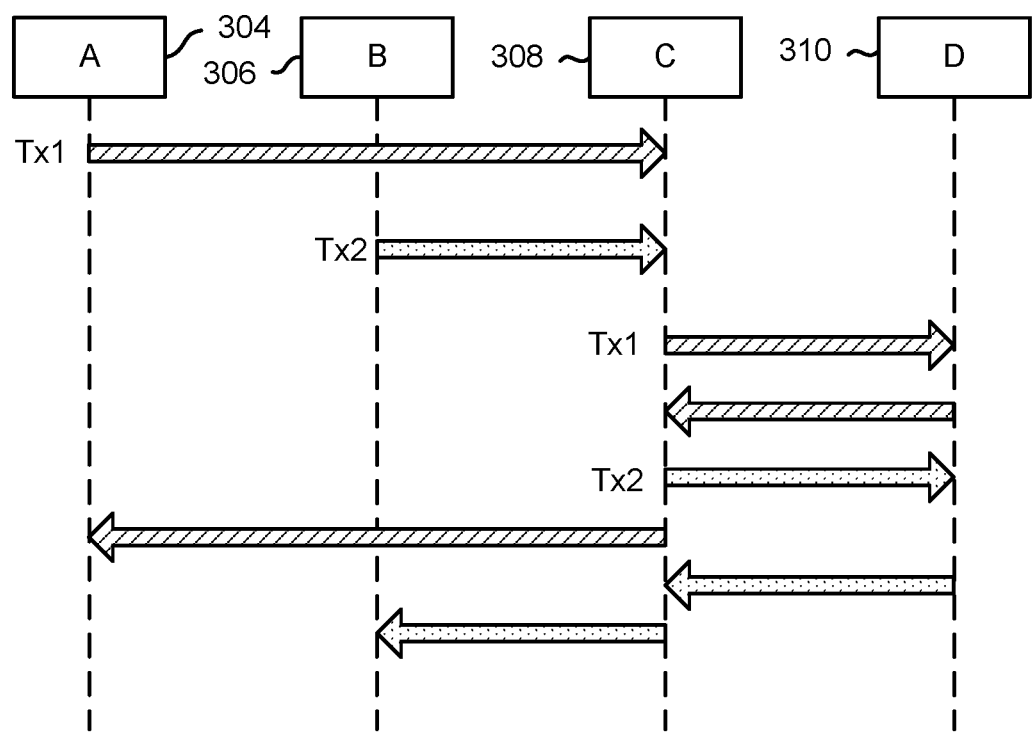
FIG. 3E is a call sequence diagram illustrating an embodiment of a system and process to safely store data at high volume and scale.

FIG. 3E is a call sequence diagram illustrating an embodiment of a system and process to safely store data at high volume and scale. In the example shown, two transactions are executed concurrently, a first labeled "Tx1" in FIG. 3E and a second labeled "Tx2".

In various embodiments, contention between concurrent transactions are managed in a decentralized manner, e.g., as illustrated in FIG. 3E. Where transaction chains do not overlap, they are free to execute in parallel. This leads to high performance for the system while maintaining strong safety properties.

In various embodiments, coordination is federated across the database rather than being a centralized role. Federating the coordinator role leads to better performance as a systemic bottleneck is removed.

In various embodiments, where transaction chains cross at a given shard, that shard alone has the responsibility for ordering execution. The fact that each transaction proceeds from the lexically lowest shard ID participating in that transaction to the lexically highest ensures safe transaction update ordering for contended concurrent updates, as illustrated by the example shown in FIG. 3E. Transaction chains all move in the same direction (from the shard with the lowest lexical ID to the highest) which reduces the computational complexity for processing transactions which overlap.

When chains cross on a shard, that shard chooses to pause one while permitting the other to proceed. Note that the shard is the chosen as the "unit of contention" in this disclosure for clarity. In various embodiments, shard, memory page, database object, fine-grained locks, or other shard machinery are used to detect when two chains overlap providing finer degrees of contention and greater parallelism. In the example shown in FIG. 3E, Tx1 and Tx2 cross on shard C and one of them will be paused while the other is allowed to make progress. In the example shown, shard C received both Tx1 and Tx2 and selected Tx1 to proceed while holding Tx2. Only after the return message is received at shard C from shard D to "apply" updates associated with Tx1 does shard C allow Tx2 to continue, in this example by sending to shard D a message to "commit" Tx2. (In this example, shard D is the next shard in the chain for both Tx1 and Tx2, but Tx2 might instead have a different shard next in lexical order after shard C.)

Since transactions do not race, they have a consistent application ordering on each shard they subsequently intersect. This order is easily imposed by the first shard at which they contend. However, the consistent delivery order (a safe partial ordering) is maintained at the expense of theoretical maximum concurrency.

The choice of Tx1 before Tx2 or Tx2 before Tx1 can be random, or might be biased based on workload priority, length of chain or some other measure. When Tx1's return chain meets Shard C, it applies to the database model and then allows Tx2 to proceed with its outward chain. Tx1's return chain can then safely continue in parallel with Tx2's outward chain.

The ordering (e.g. Tx1 before Tx2) imposed by Shard C is by definition obeyed by all the other shards involved in those transactions Tx1 and Tx2. Referring to FIG. 3E, Tx1 will be processed by every downstream shard in its chain before the "commit" for Tx2 is passed to any shard beyond shard C, ensuring the Tx1 is processed first on each and every shard at which they may overlap. In various embodiments, consistently ordered transaction application keeps data coherent across shards without the performance-inhibiting requirement for a centralized coordinator.

Serializing activity on a contended shard applies for any number of concurrent transactions. Should greater concurrency be required, the sharding strategy for the database can be changed to spread load across more shards and thus reduce blocking contention.

In various embodiments, the constraint that chained transactions run from lexically smallest to lexically highest ID shards greatly simplifies the protocol compared to other chain replication protocols which demand the maintenance of complex dependency graphs in exchange for greater flexibility. The transaction protocol is simpler to reason about and the machinery easier to implement in a bug-free manner but at the expense of some flexibility.

Figure 4:
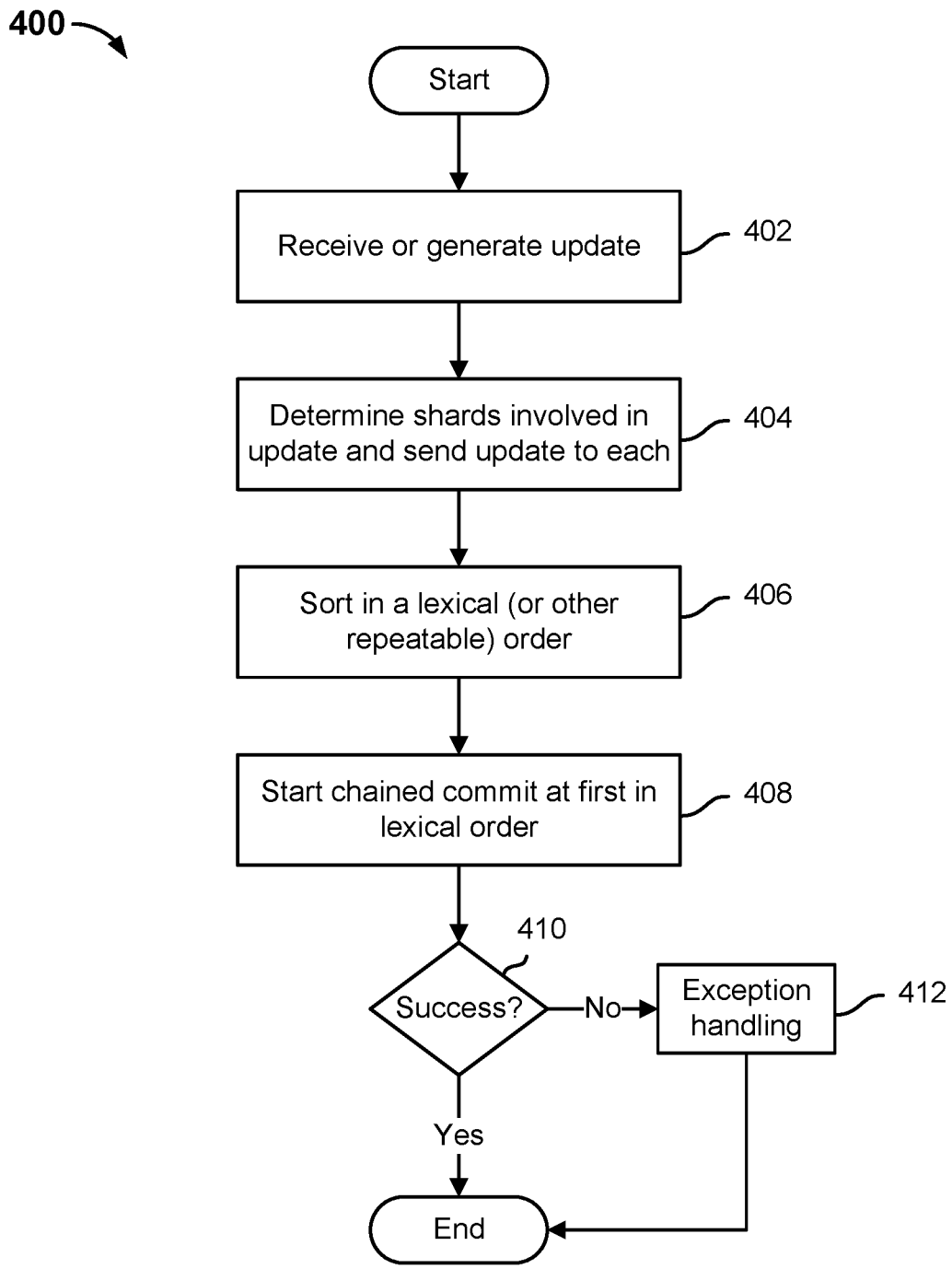
FIG. 4 is a flow diagram illustrating an embodiment of a process to update data in a distributed graph database system according to a chained commit protocol.

FIG. 4 is a flow diagram illustrating an embodiment of a process to update data in a distributed graph database system according to a chained commit protocol. In various embodiments, the process 400 of FIG. 4 is performed by a client system or device, such as clients 102, 104, and 106 of FIG. 1. In the example shown, at 402, an update is received or generated. For example, a client application may have been used by an end user to update a data value. At 404, the shards that will participate in a transaction to store the update to the distributed database are determined and the update is sent to each participating shard. To identify the participating shards, in some embodiments, the client may send a "tracer" transaction to determine which shards have data implicated by the update. At 406, the participating shards are sorted in a lexical (or other repeatable) order, such as by server identifier (ID). At 408, a chained commit protocol is triggered for the transaction by sending a "commit" message to the participating shard that is first in the lexical (or other) order determined at 406. If a return message is received at 410 indicating the transaction was completed successfully, successful completion is noted, and the process ends. If not, exception handling is performed at 412; for example, the client application or process may try again to execute the transaction.

Figure 5:
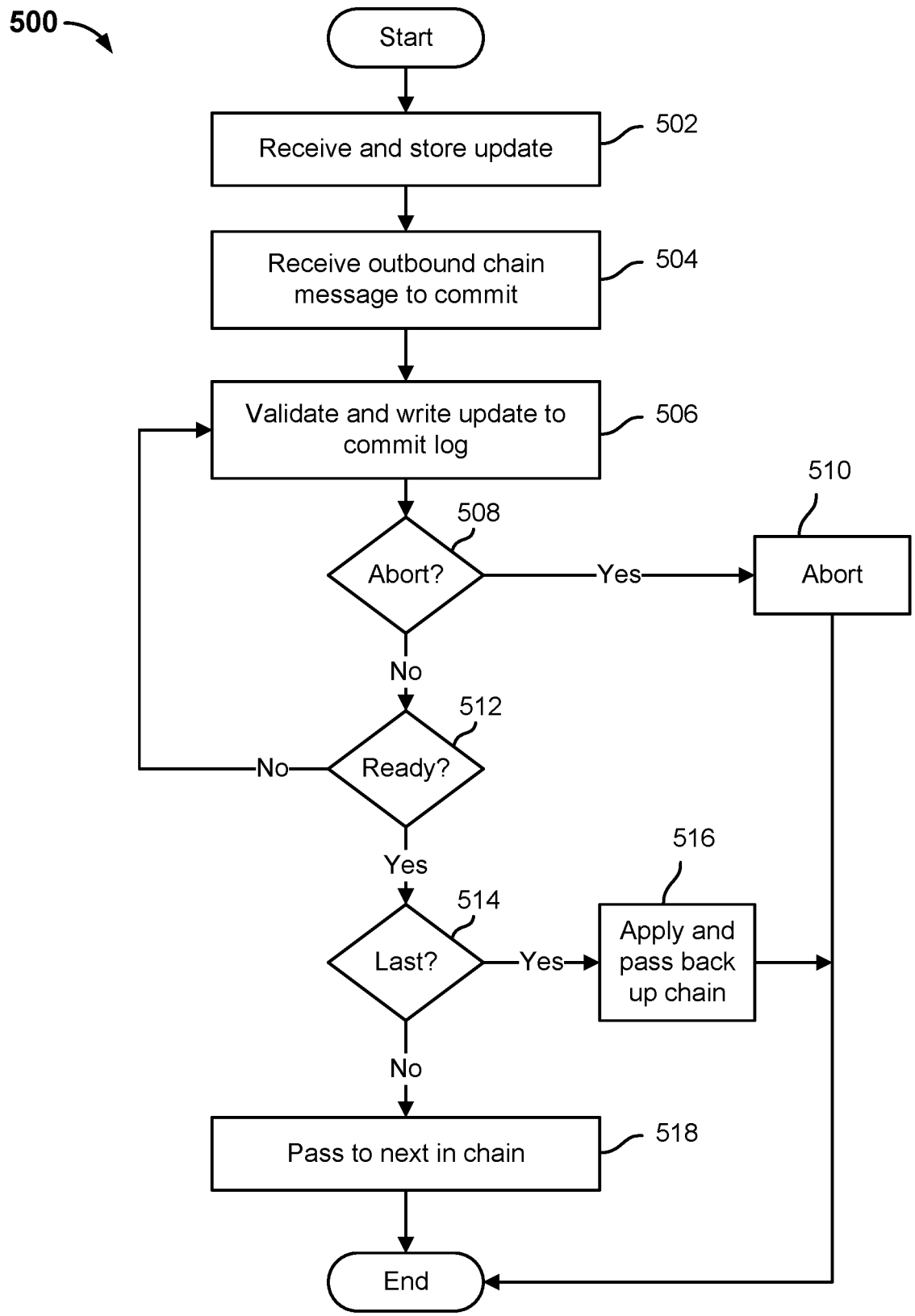
FIG. 5 is a flow diagram illustrating an embodiment of a process to update data in a distributed graph database system according to a chained commit protocol.

FIG. 5 is a flow diagram illustrating an embodiment of a process to update data in a distributed graph database system according to a chained commit protocol. In various embodiments, the process 500 of FIG. 5 is performed by server and/or shard comprising a group of servers, such as servers 304, 306, 308, and 310 of FIGS. 3A-3E. In various embodiments, the process 500 implements the outbound (update and commit) leg of the chained commit protocol, e.g., as shown in FIGS. 3A, 3B, and 3C. In the example shown, a transaction to update a locally stored portion (e.g., shard) of data comprising a distributed database is received and stored. At 504, a "commit" message or command is received, e.g., in connection with an outbound leg of a chained commit protocol. At 506, the update/transaction is validated and if validated is written to a local commit log. In various embodiments, the commit log entry is replicated to other servers comprising the shard, e.g., under the Raft protocol.

If an indication to abort the transaction is received (508), e.g., a next upstream server/shard in the commit protocol chain for the transaction sends a message to abort or the update is determined to violate a constraint, the transaction is aborted at 510. If the server/shard performing the process 500 is the first server/shard in the commit chain for the transaction, the server/shard notifies the client the transaction has been aborted. Otherwise, the server/shard passes an abort message to the server/shard the immediately precedes it (e.g., in lexical order) in the commit chain for the transaction.

If the transaction is not aborted (508), once the server/shard is ready to proceed (512), e.g., once the commit has been replicated to at least a majority of servers comprising the shard, if the server/shard is the last in lexical order in the commit chain for the transaction (514), the server applies the update to its local database model at 516 and passes a message to "apply" the update back up the chain, via a communication to the server immediately preceding it in lexical order. Otherwise, at 518 the server passes the "commit" message to the next server/shard in the chain.

Figure 6:
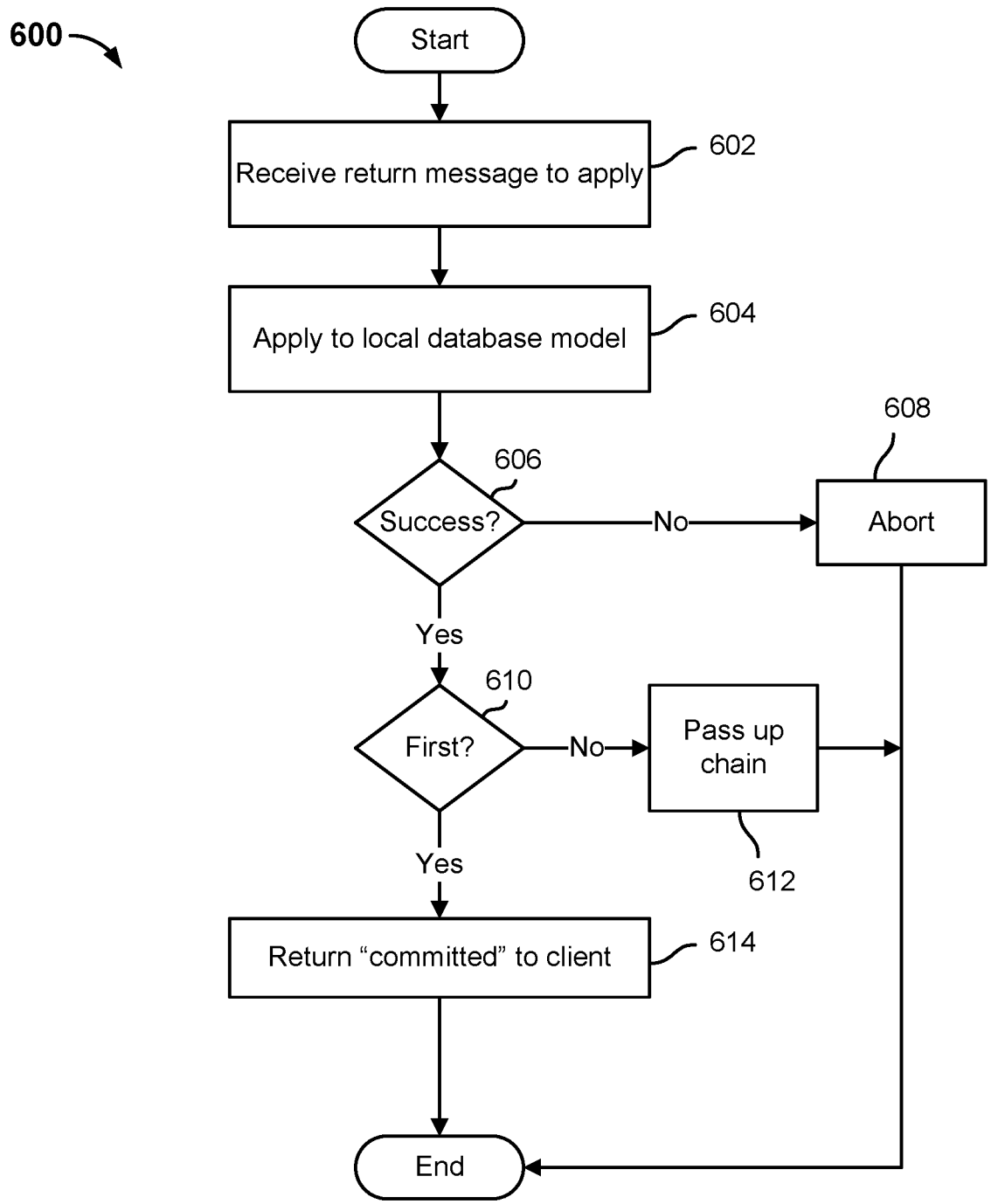
FIG. 6 is a flow diagram illustrating an embodiment of a process to update data in a distributed graph database system according to a chained commit protocol.

FIG. 6 is a flow diagram illustrating an embodiment of a process to update data in a distributed graph database system according to a chained commit protocol. In various embodiments, the process 600 of FIG. 6 is performed by server and/or shard comprising a group of servers, such as servers 304, 306, 308, and 310 of FIGS. 3A-3E. In various embodiments, the process 600 implements the return (apply to data model) leg of the chained commit protocol, e.g., as shown in FIGS. 3A, 3B, and 3C. In the example shown, at 602 a return message (i.e., coming back up the chain, from the last server in the chain in the direction of the first server) to "apply" the update is received. At 604, the update is applied to the local database model. If the update cannot be applied successfully to the local database model (606), at 608 an "abort" of the transaction is initiated and processed locally. If the update is applied successfully to the local database model (606), then if the server/shard performing the process of FIG. 6 is the first server (e.g., in lexical order) in the commit chain for the transaction (610), at 614 the server notifies the client the transaction has been committed. Otherwise, at 612 the server passes the "apply" message up the commit chain, e.g., to the server immediately preceding it in lexical order in the chain.

FIG. 7 is a flow diagram illustrating an embodiment of a process to abort a transaction to update data in a distributed graph database system according to a chained commit protocol. In various embodiments, the process 700 of FIG. 7 is performed by server and/or shard comprising a group of servers, such as servers 304, 306, 308, and 310 of FIGS. 3A-3E, for example to abort a transaction that cannot be completed by the entire chain, as in the example shown in FIG. 3D. In the example shown, at 702 an indication to abort a transaction is received. If the update has not yet been persisted locally (e.g., not written successfully to the local commit log and replicated as required by the applicable replication protocol) (704), the update is deleted at 706. If the update has been persisted locally (e.g., written successfully to the commit log and replicated on a majority of servers in the replication group) (704), then at 708 an abort token is written to the commit log. If the server performed the process 700 is the first server in the commit chain for the transaction (710), then at 712 the server notifies the client the transaction has been aborted. Otherwise, at 714 the server notifies the server that immediately precedes it in the commit chain to abort the transaction. The "abort" processing according to FIG. 7 is performed successively by servers comprising the commit chain, each aborting locally and passing the message to abort back up the chain (710, 714), until the first server is reached and aborts the transaction, after which the first server informs the client at 712 the transaction has been aborted.

FIG. 8 is a flow diagram illustrating an embodiment of a process to recover from a failure in a distributed graph database system configured to implement a chained commit protocol. In various embodiments, the process 800 of FIG. 8 is performed by server and/or shard comprising a group of servers, such as servers 304, 306, 308, and 310 of FIGS. 3A-3E, e.g., to recover from a failure resulting in one or more transactions being aborted, as in the example shown in FIG. 3D.

Owing to the abort machinery, recovery of a server participating in a chained commit protocol as disclosed herein is slightly more complicated, in various embodiments, than traditional transaction models. On local recovery of a failed shard, each server must make two passes through its log to reestablish current model state. The first is to locate any abort records in the log, and the second is to apply any records for which there is no corresponding abort record which restores local state. Any transactions whose outcome is unknown at this point can be resolved by asking the next highest shard for each given transaction for its outcome.

In the example recovery process 800 shown in FIG. 8, at 802 a first pass through the commit log is made and aborted updates/transactions are noted. At 804, a second pass is made through the commit log and updates that have not been noted as aborted are applied. At 806, for each transaction for which the outcome (e.g., aborted, still in progress, or completed successfully by the rest of the chain) is not known, the ambiguity is resolved by asking the next highest shard in the commit chain for that transaction to report its outcome/state with respect to the transaction. In various embodiments, the next highest shard may report one of the following: committed, applied, and abort. If committed, the inquiring shard waits for an "applied" message. If the state is reported as "applied", the inquiring shard applies the transaction and sends a message to the next shar up the chain (or the client). If the state is "abort" the inquiring shard writes an abort pointer to its log and sends an abort message to the next shard up the chain (or the client).

Figure 9:
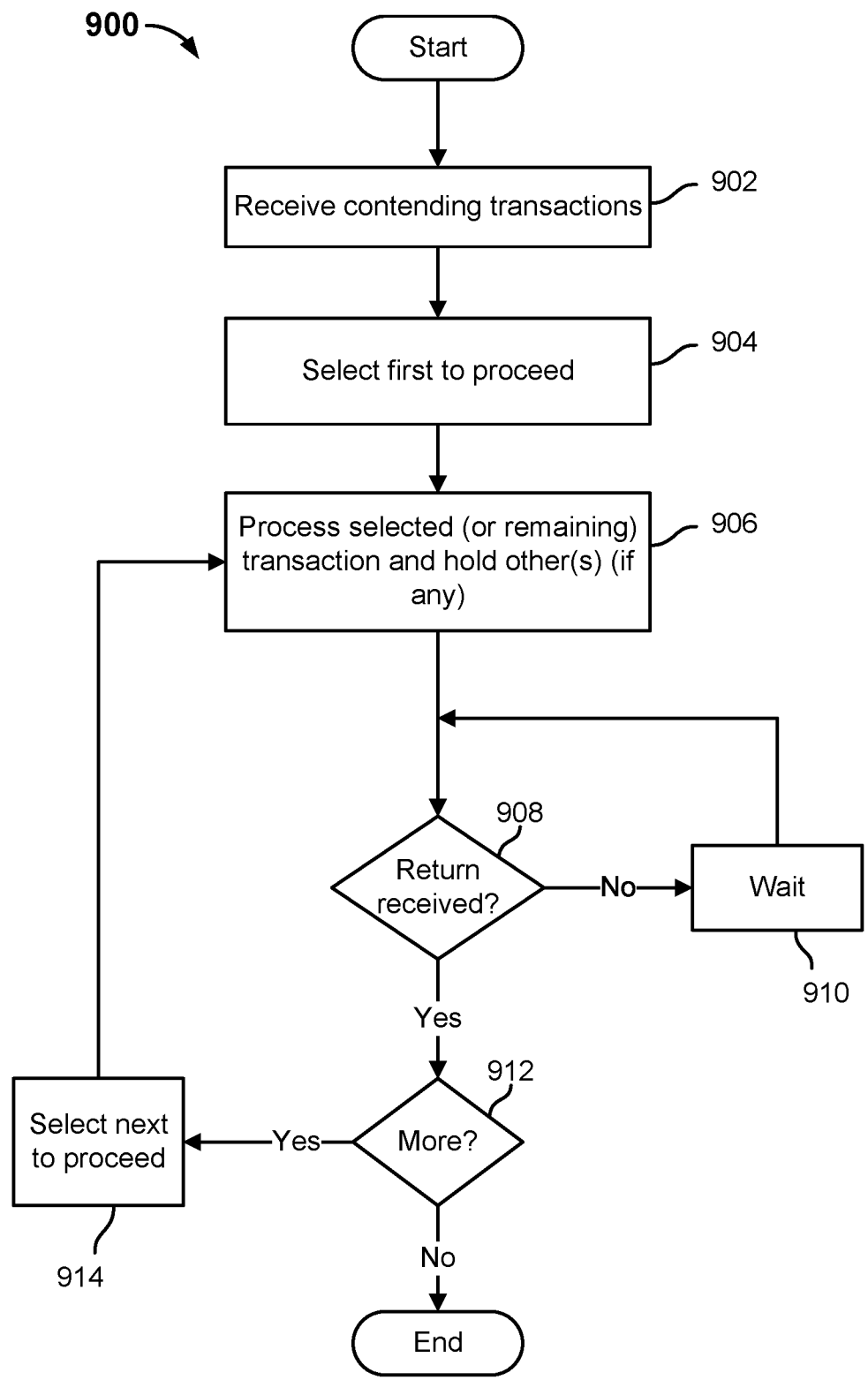
FIG. 9 is a flow diagram illustrating an embodiment of a process to manage contending transactions in an embodiment of a distributed graph database system.

FIG. 9 is a flow diagram illustrating an embodiment of a process to manage contending transactions in an embodiment of a distributed graph database system. In various embodiments, the process 900 of FIG. 9 is performed by server and/or shard comprising a group of servers, such as servers 304, 306, 308, and 310 of FIGS. 3A-3E, e.g., to ensure proper ordering of contending transactions, as in the example shown in FIG. 3E. In the example shown, at 902 two or more contending transactions are received, e.g., Tx1 and Tx2 received at server C (308) in the example shown in FIG. 3E. At 904, the server selects from among the contending transactions it has not yet processed a first (or next) transaction to proceed. At 906, the transaction selected at 904 to go first is processed locally and passed down to the next server in the commit chain for that transaction, while the other, contending transactions are held. Once (and not until) the return (e.g., "apply") message is received, indicating that all the downstream servers in the commit chain for the transaction selected at 904 have committed and applied that transaction (908, 910), if one or more contending transactions remain to be processed, then at 914 the server selects a next one to proceed and processes that transaction while holding (e.g., continuing to hold) any other contending transactions that remain to be processed. The process 900 ends once all contending transactions have been processed (912).

In various embodiments, techniques disclosed herein enable data comprising a labelled property graph structure to be persisted safely and performantly across a number of collaborating computer servers. A safe partial ordering of updates is imposed with respect to updates to a single (potentially large) graph structure partitioned across multiple cooperating computer servers.

In various embodiments, a system as disclosed herein method upholds ACID semantics while permitting concurrent updates at multiple servers with low coordination overhead. This allows distributed graph databases to store data safely while exhibiting a useful degree of concurrent processing for scalability to manage large data sets and challenging workloads.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive via the communication interface a first indication to commit a first update to data comprising a distributed data object and a second indication to commit a second update to data comprising the distributed data object, the first update being associated with a first chained commit protocol chain of servers that is independent of a second chained commit protocol chain of servers associated with the second update;
select the first update to proceed first;
store data committing the first update locally;
send via the communication interface a commit message to a next server in the first chained commit protocol chain of servers associated with the first update, the next server being determined at least in part on a sorting in a repeatable order of said servers associated with the first update; and
wait to apply the first update to a local database model and to proceed with the second update until a message to apply the first update is received from the next server.

2. The system of claim 1, wherein the processor is further configured to receive the first update via the communication interface.

3. The system of claim 1, further comprising a memory configured to store the first update.

4. The system of claim 1, wherein the processor is further configured to receive via the communication interface said message to apply the first update; and apply the first update to the local database model based at least in part on receipt of the message to apply the first update.

5. The system of claim 4, wherein the processor is further configured to pass to a preceding server that immediately precedes the system in the chain, if any, a message to apply the first update.

6. The system of claim 5, wherein the processor is further configured to determine that the system comprises a first server in the chain and, subsequent to applying the first update to the local database model, to inform a client with which the first update is associated that the first update has been committed.

7. The system of claim 1, wherein the processor is further configured to determine that the system comprises a last server in the chain and, based at least in part on the determination that the system comprises the last server in the chain, to apply the first update to the local databased model.

8. The system of claim 7, wherein the processor is further configured to pass to a preceding server that immediately precedes the system in the chain, if any, a message to apply the first update.

9. The system of claim 1, wherein the distributed data object comprises a distributed database record.

10. The system of claim 1, wherein the processor is further configured to abort the first update in response to an indication to abort.

11. The system of claim 10, wherein the indication comprises a determination that the first update would violate a constraint.

12. The system of claim 11, wherein the indication comprises a message to abort received via the communication interface.

13. The system of claim 12, wherein the message is received from the next server in the first chained commit protocol chain of servers.

14. The system of claim 1, wherein the processor is included in one of a plurality of servers comprising a replication group of servers.

15. The system of claim 14, wherein the processor is configured to send the commit message to the next server based at least in part on a determination that the data committing the first update locally has been replicated successfully under a replication protocol implemented by the replication group of servers.

16. The system of claim 1, wherein the processor is further configured to recover from a failure at least in part by making a first pass through a commit log to note any transactions that have been aborted and a second pass through the commit log to apply any updates that have not been aborted.

17. A method, comprising:
receiving via a communication interface a first indication to commit a first update to data comprising a distributed data object and a second indication to commit a second update to data comprising the distributed data object, the first update being associated with a first chained commit protocol chain of servers that is independent of a second chained commit protocol chain of servers associated with the second update;
selecting the first update to proceed first;
storing data committing the first update locally;
sending via the communication interface a commit message to a next server in the first chained commit protocol chain of servers associated with the first update, the next server being determined at least in part on a sorting in a repeatable order of said servers associated with the first update; and
waiting to apply the first update to a local database model and to proceed with the second update until a message to apply the first update is received from the next server.

18. The method of claim 17, further comprising receiving via the communication interface said message to apply the first update; and applying the first update to the local database model based at least in part on receipt of the message to apply the first update.

19. A computer program product embodied in a non-transitory computer readable medium, comprising computer instructions for:
receiving via a communication interface a first indication to commit a first update to data comprising a distributed data object and a second indication to commit a second update to data comprising the distributed data object, the first update being associated with a first chained commit protocol chain of servers that is independent of a second chained commit protocol chain of servers associated with the second update;
selecting the first update to proceed first;
storing data committing the first update locally;
sending via the communication interface a commit message to a next server in the first chained commit protocol chain of servers associated with the first update, the next server being determined at least in part on a sorting in a repeatable order of said servers associated with the first update; and waiting to apply the first update to a local database model and to proceed with the second update until a message to apply the first update is received from the next server.

* * * * *